United States Patent
Riedel et al.

(10) Patent No.: US 10,571,320 B2
(45) Date of Patent: Feb. 25, 2020

(54) FLOW MEASUREMENT USING ULTRASOUND TO DETECT A TIME OF FLIGHT DIFFERENCE USING NOISE MEASUREMENTS

(71) Applicant: SICK ENGINEERING GMBH, Ottendorf-Okrilla (DE)

(72) Inventors: Ekkehard Riedel, Ottendorf-Okrilla (DE); Gerry Schröter, Ottendorf-Okrilla (DE); Toralf Dietz, Ottendorf-Okrilla (DE)

(73) Assignee: SICK ENGINEERING GMBH, Ottendorf-Okrilla (DE)

( * ) Notice: Subject to any disclaimer, the term of this patent is extended or adjusted under 35 U.S.C. 154(b) by 80 days.

(21) Appl. No.: 15/901,014

(22) Filed: Feb. 21, 2018

(65) Prior Publication Data
US 2018/0252563 A1 Sep. 6, 2018

(30) Foreign Application Priority Data
Feb. 24, 2017 (EP) .................................... 17157914

(51) Int. Cl.
*G01F 1/66* (2006.01)
*G01F 1/32* (2006.01)

(52) U.S. Cl.
CPC ............ *G01F 1/668* (2013.01); *G01F 1/3281* (2013.01); *G01F 1/66* (2013.01); *G01F 1/666* (2013.01)

(58) Field of Classification Search
None
See application file for complete search history.

(56) References Cited

U.S. PATENT DOCUMENTS 4,596,133 A * 6/1986 Smalling ................. G01F 1/662
   73/24.01
4,754,650 A * 7/1988 Smalling ................. G01F 1/662
   73/861.28
(Continued)

FOREIGN PATENT DOCUMENTS

DE    28 09 254 A1    9/1978
DE   103 12 034 B3    3/2004
(Continued)

OTHER PUBLICATIONS

European Search Report dated Jul. 27, 2017 issued in corresponding European Application No. 17157914.7.
(Continued)

*Primary Examiner* — Harshad R Patel
(74) *Attorney, Agent, or Firm* — Nath, Goldberg & Meyer; Jerald L. Meyer; Stanley N. Protigal

(57) ABSTRACT

A measurement apparatus (10) and to a method provide for the determination of a flow rate (v) and/or of a throughflow (Q) of a fluid (14) flowing in a conduit (12). At least one first ultrasonic transducer (18) and one second ultrasonic transducer (20) permit a flow rate determination via the time of flight of an ultrasound signal. To further improve the determination of a flow rate of a fluid using ultrasonic transducers, in particular at very high flow rates, and to enable the measurement of very high flow rates, a noise-measuring ultrasonic transducer (18, 20; 24) is provided that measures the noise generated in on the flowing past of the fluid (14) in the ultrasonic transducer, and a control and evaluation device (32) is configured to determine the flow rate (v) using the noise measurements.

18 Claims, 3 Drawing Sheets

(56) References Cited

U.S. PATENT DOCUMENTS

Figure 1:
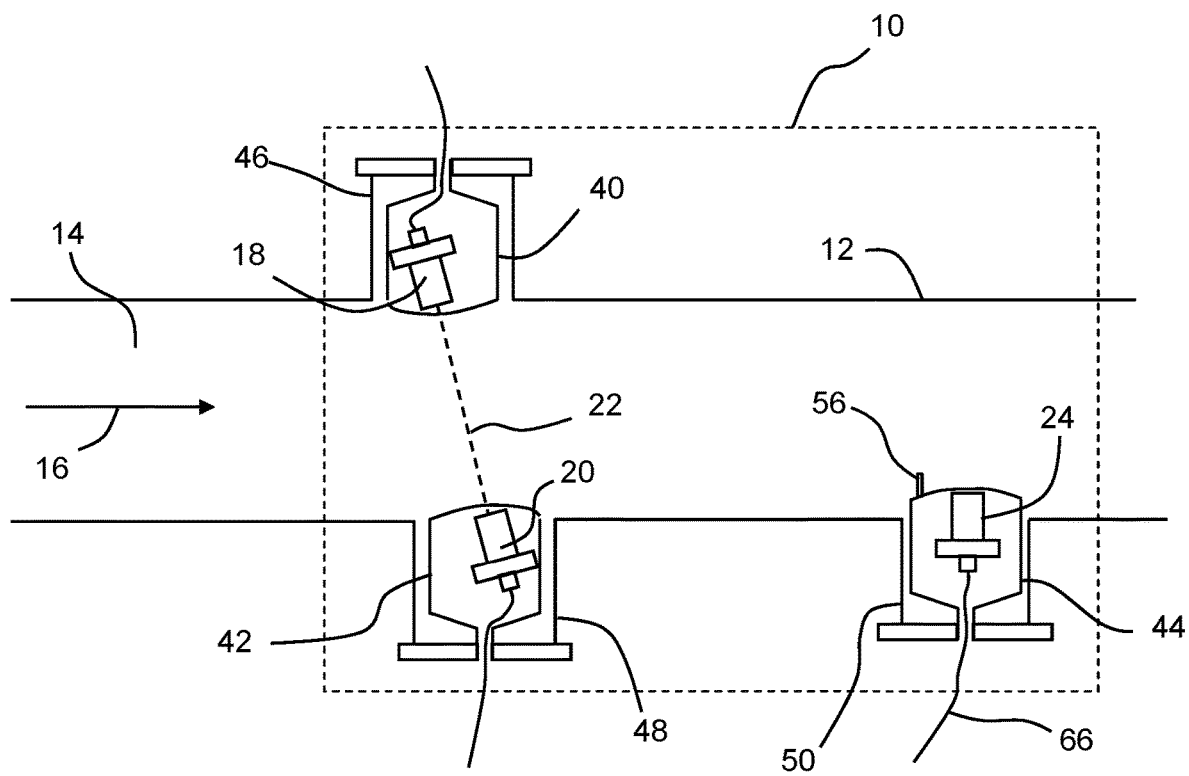

| | | | | |
|---|---|---|---|---|
| 4,856,321 A * | 8/1989 | Smalling | ............... | G01F 1/662 73/40.5 A |
| 8,903,663 B2 * | 12/2014 | Shiba | ............... | G01F 1/667 702/48 |
| 2007/0084286 A1 * | 4/2007 | Ajay | ............... | G01F 1/667 73/597 |
| 2010/0000309 A1 * | 1/2010 | Bierl | ............... | F02B 39/16 73/114.77 |
| 2012/0055239 A1 * | 3/2012 | Sinha | ............... | G01N 29/024 73/61.79 |
| 2015/0276445 A1 * | 10/2015 | Black | ............... | G01F 1/66 73/861.24 |
| 2019/0033261 A1 * | 1/2019 | Nielsen | ............... | G01D 4/00 |

FOREIGN PATENT DOCUMENTS

| | | |
|---|---|---|
| EP | 1 118 841 A2 | 7/2001 |
| EP | 2 103 911 A1 | 9/2009 |
| EP | 2 103 912 B1 | 9/2016 |
| GB | 1372724 A | 11/1974 |
| JP | S58191924 A | 11/1983 |
| JP | 03-097622 U | 10/1991 |
| RU | 2140538 C1 | 10/1999 |
| RU | 2489685 C2 | 8/2013 |
| RU | 2566158 C2 | 10/2015 |
| WO | 2015/040607 A1 | 3/2015 |

OTHER PUBLICATIONS

Hans et al., "Comparison of pressure and ultrasound measurements in vortex flow meters", Measurement, vol. 33, pp. 121-133, 2003.
How much do you flare?, Instrumentation, Process Worldwide, Mar. 2006.

* cited by examiner

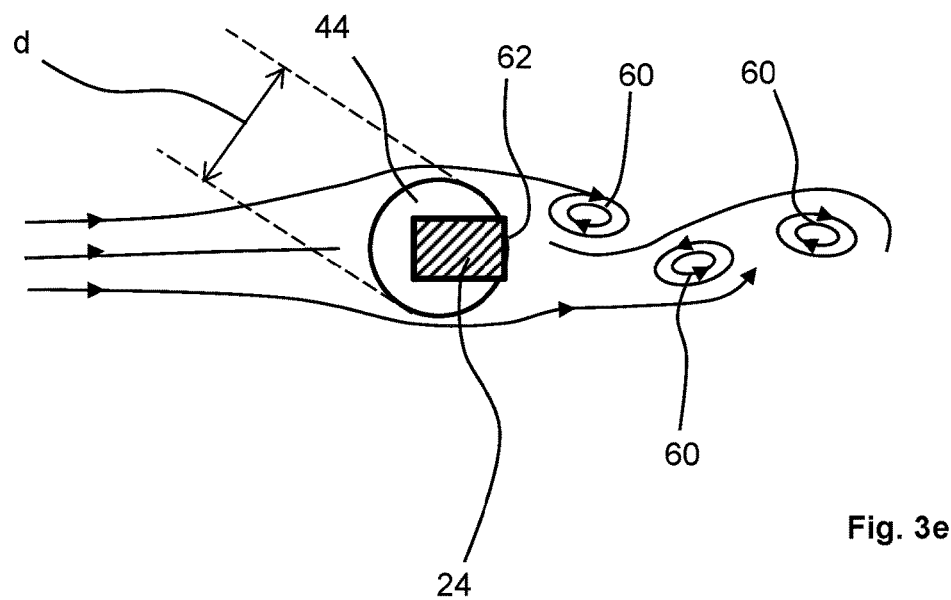
Fig. 3e
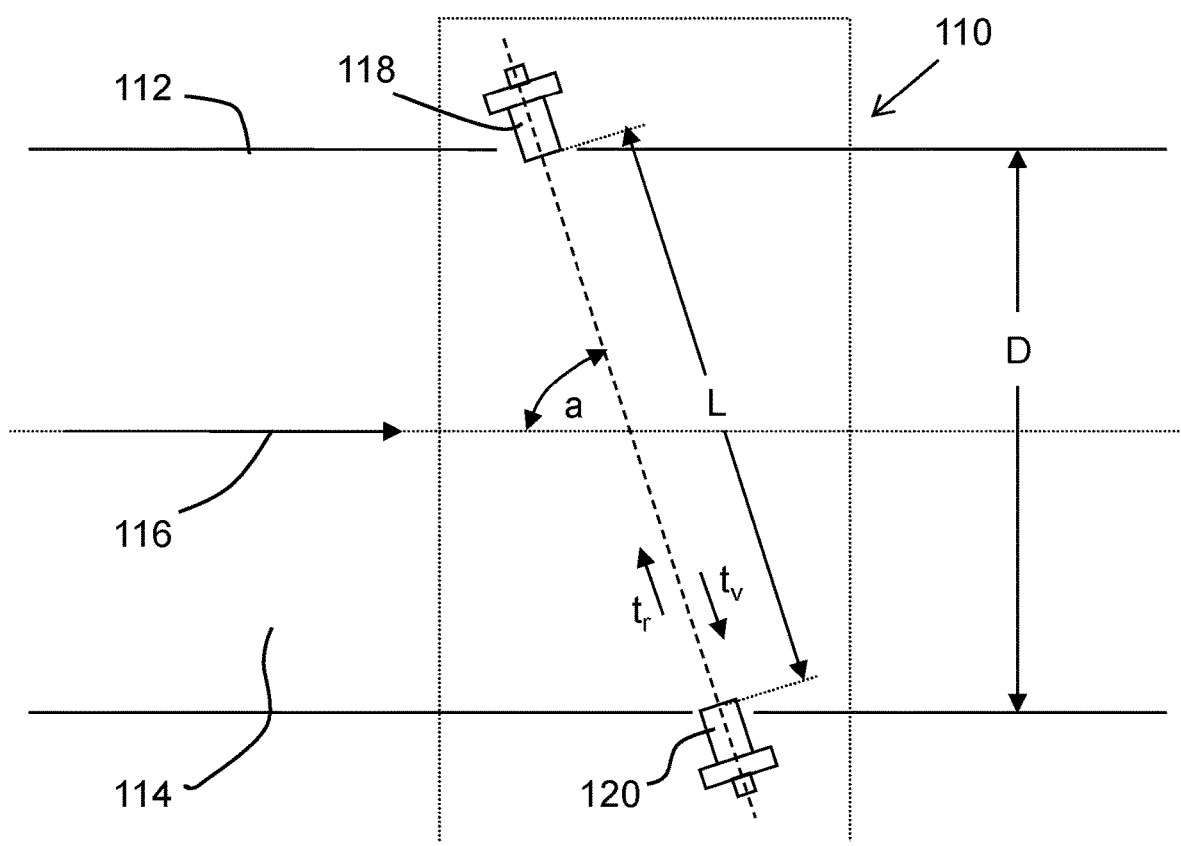
Fig. 4 (State of the Art)

FLOW MEASUREMENT USING ULTRASOUND TO DETECT A TIME OF FLIGHT DIFFERENCE USING NOISE MEASUREMENTS

The invention relates to a measurement apparatus and to a method for the determination of a flow rate and/or of a throughflow of a fluid flowing in a conduit, the measurement apparatus comprising at least one first ultrasonic transducer and one second ultrasonic transducer that are arranged with respect to one another in the conduit such that in operation the ultrasound transmitted and received on a measurement path from the first ultrasonic transducer to the second ultrasonic transducer has a time of flight difference dependent on the flow rate with respect to ultrasound in the reverse direction on the measurement path transmitted by the second ultrasonic transducer and received by the first ultrasonic transducer, and a control and evaluation unit configured to control the ultrasonic transducers and to evaluate the signals of the ultrasonic transducers. The invention further relates to a method for the determination of a flow rate of a fluid flowing in a conduit, wherein a time of flight difference of ultrasound dependent on the flow rate between a first ultrasonic transducer and a second ultrasonic transducer is evaluated, namely of ultrasound that propagates on a measurement path from the first ultrasonic transducer to the second ultrasonic transducer and in the reverse direction from the second ultrasonic transducer to the first ultrasonic transducer.

Ultrasound technology using the difference time of flight method can be used for the measurement of fluid rates in pipelines and channels. In this process, ultrasonic pulses are transmitted and received by a pair of ultrasonic transducers that are arranged opposite one another at a wall of the conduit and the flow rate is determined from the time of flight difference between a measurement path with the flow and the measurement path in the opposite direction against the flow. This known measurement principle is shown in FIG. 4. As essential components of a conventional measurement apparatus 110, two ultrasonic transducers 118, 120 are arranged at an angle in the wall of a pipeline 112 in which a fluid 114 flows in the direction of the arrow 116. The ultrasonic transducers 118, 120 work alternately as transmitters and receivers. The ultrasound signals transported through the gas are accelerated in the direction of flow and are decelerated against the direction of flow. The resulting time of flight difference is calculated using geometrical parameters to form a mean fluid rate. The operating volume flow results from this with the cross-sectional surface. The geometrical relationships are described by the following variables:

v: flow speed of the fluid in the conduit
L: length of the measurement path between the two ultrasonic transducers
α: angle at which the ultrasonic transducers transmit and receive
Q: volume flow
D: diameter of the conduit
$t_v$: time of flight of the ultrasound with the flow and
$t_r$: time of flight of the ultrasound against the flow The following relationships result from this for the sought variables v and Q:

$$vL/(2 \cos \alpha)(1/t_v - 1/t_r) \text{ and} \quad (1)$$

$$Q = v \tfrac{1}{4} D^2 \pi. \quad (2)$$

The flow measurement of gases moved at a very high speed in conduits is a particularly demanding application. High speeds here means flows having a Mach number of >0.2. An example for this is formed by flare gas conduits that lead to flare towers in petrochemical plant and in which residual gases of the production process or, in cases of accident, large gas quantities are discharged from the plant at high speed such as descried in the article "How much do you flare?", Daryl Belock, in PROCESS—worldwide 3-2006, 1 Mar. 2006 (2006-03-01), pages 18-9, XP055213253. Ultrasound measurement is also used due to a lack of alternatives for such high flow rates of a gas of 100 m/s and more. This is, however, associated with difficulties since, due to the breakaway vortex at the ultrasonic transducer, substantial noise of the transducer occurs. Furthermore, strong signal distortion and thus a deterioration of the signal-to-noise ratio occur when the signal packet is transmitted through the breakaway vortex to the oppositely disposed probe. An additional drift of the irradiated signal with the gas flow is moreover problematic.

These problems result in a limitation of the maximum measurable speed. Due to physical relationships, this value is substantially dependent on the gas medium, on the specific damping dependent on the signal frequency, on the spacing of the sensors, that is on the nominal pipe width, and on their radiation characteristic and on the working frequency of the ultrasonic transducers.

A measure used in the prior art to improve the measurement result with ultrasound is to set up an additional correction value of a few degrees against the flow so that transmitted ultrasound would therefore miss the respective counterpart with ideal, straight measurement paths and is driven with the respective flow to the oppositely disposed ultrasound transceiver due to the drift. Effects of the high gas speed should thus be compensated. In addition, complex signal evaluations are carried out to compensate flow effects, e.g. noise. These measures are complex and/or expensive and are not, however, sufficient to achieve satisfactory measurement accuracy. These measures also fail at very high flow rates.

It is in particular known with pipelines having a large nominal width to introduce the ultrasonic transducer completely into the gas to shorten the measurement path. It is proposed for this purpose in the prior art (U.S. Pat. No. 4,754,650) to introduce both ultrasonic transducers into the flow using a holder. The ultrasonic transducers are attached to the common holder that is introduced obliquely into the conduit like a lance so that at least one ultrasonic transducer is arranged in the inner space of the conduit. In accordance with the description of U.S. Pat. No. 4,754,650, this arrangement serves for the particularly accurate measurement of low flow rates and is completely unsuitable at high flow rates and with conduits of large nominal widths due to extreme flow disturbances by the holder. High breakaway turbulence occurs at the ultrasonic transducers and at the holder, whereby pressure waves and thus highly disturbing noise is caused on the ultrasonic transducers.

Finally, an ultrasound flowmeter is known from EP 2 103 912 B1 that is in particular adapted for high flow rates. The ultrasonic transducers and the holder surrounding them have a specific flow-optimized contour there that suppresses breakaway vortices and thus also reduces disturbing noise at high flow rates. These measures also fail at very high flow rates.

It is known from DE-A 2809254 to determine a flow rate via the generation of breakaway vortices using the relationship $$f = S^*(v/d) \quad (3)$$

where f is the emission frequency of the vortices; S is the Strouhal number; v is the flow rate; and d is a characteristic transverse dimension of an obstacle at which the vortices arise. The Strouhal number generally amounts to 0.21. Ultrasonic sensors are inter alia proposed in this document in addition to thermal, piezoelectric, capacitive, and inductive sensors for measuring the frequency.

Starting from this prior art, it is the object of the invention to provide a measurement apparatus and a method with which the determination of a flow rate of a fluid is possible using ultrasonic transducers over a large flow rate range and which enable the measurement of high flow rates.

This object is satisfied by a measurement apparatus and by a measurement method in accordance with the respective independent claim.

The solution in accordance with the invention starts from the recognition that flow disturbances, e.g. breakaway vortices, cannot be avoided at high flow rates and thus associated disturbing noise generation cannot be avoided. But instead of suppressing these disturbances as much as possible, the invention takes another path, namely utilizing the noise generation.

For this purpose, the measurement apparatus has at least one first ultrasonic transducer and one second ultrasonic transducer for the determination of a flow rate and/or of a throughflow of a fluid flowing in a conduit, said first and second ultrasonic transducers being utilized in a conventional, known manner to determine the flow rate. For this purpose, the transducers are arranged with respect to one another in the conduit such that the ultrasound transmitted and received in operation on a measurement path from the first ultrasonic transducer to the second ultrasonic transducer has a time of flight difference dependent on the flow rate with respect to ultrasound transmitted in the opposite direction on the measurement path by the second ultrasonic transducer and received by the first ultrasonic transducer. Furthermore, a control and evaluation device for controlling the ultrasonic transducers and for evaluating the signals of the ultrasonic transducers is provided that evaluates the signals of the ultrasonic transducers in a known manner (see above equations (1) and (2)) and that determines the flow rate therefrom. In accordance with the invention, a noise-measuring ultrasonic transducer is provided that measures the noise generated on the flowing past of the fluid in this ultrasonic transducer. The control and evaluation device is configured to determine the flow rate with reference to the noise measurements.

In a first embodiment, the noise-measuring ultrasonic transducer can be formed by the first or second ultrasonic transducer itself. In this embodiment, an ultrasonic transducer having this double function can, for example, work in time multiplex, once for the time of flight measurement and once for the noise measurement.

The noise-measuring ultrasonic transducer preferably differs from the first and second ultrasonic transducers since then the first and second ultrasonic transducers can be ideally adapted to the time of flight measurement, namely so that as little noise as possible is generated at these two ultrasonic transducers. And the noise-measuring ultrasonic transducer can be ideally configured for the noise measurement. The two measurement procedures compete against one another. The time of flight measurement requires as little noise generation as possible, while the noise measurement actually requires noise. These competing demands can be met better by a third ultrasonic transducer.

The invention has the advantage that, on the one hand, at flow rates that are not too high, the known very accurate determination of the speed is possible using the time of flight method and, if this method fails as the flow rate increases, the flow rate can nevertheless now be determined via the noise-measuring ultrasonic transducer. The measurement range is substantially expanded toward high flow rates. In this respect, the effect of the noise is used that is disturbing per se and that is unavoidable at high speeds, e.g. caused by breakaway vortices. Measurements by means of ultrasound that were previously not possible have thus become possible in a very large flow rate range.

The general advantages of ultrasound measurements with respect to other methods are equally maintained, namely independence of the pressure, temperature, and gas composition and furthermore high precision, freedom from maintenance, small effect due to contamination, possibilities of self-diagnosis, and avoidance of a pressure drop by the measurement.

The particular advantage can thus be found in the combination of the two measurement methods while utilizing the same sensor system. The respective weaknesses of the methods are compensated in so doing. At flow rates at which measurement signals of both methods are available, the measured value from the noise measurement can be automatically adjusted to the measured value of the time of flight difference. As soon as the flow rate has reached and exceeded the critical range, only the measured value of the noise-measuring ultrasonic transducer is taken.

In an embodiment, the noise-measuring ultrasonic transducer detects the energy of the noise, that is the intensity of the noise (volume) and the control and evaluation unit determines the flow rate (v) from it.

The first and second ultrasonic transducers are preferably accommodated in a respective housing. This housing can also be larger than the actual ultrasonic transducers and their membranes. It thus provides degrees of freedom of the translation and tilt of the ultrasonic transducers with respect to their housing, as the ideal measurement paths require, without changing the contour offered to the flow that is predefined by the housing in so doing.

The housing of the first and second ultrasonic transducers is particularly preferably inserted into the conduit in a perpendicular manner and the radiation surface of the respective ultrasonic transducer is tilted by an angle such that the first and second measurement paths extend obliquely with respect to a cross-sectional plane of the conduit. The measurement paths thus extend obliquely both to the direction of flow and at a perpendicular to the direction of flow. The perpendicular insertion facilitates the assembly and the alignment since an oblique, stable welding of the supports on site to achieve an exact alignment requires an increased technical effort, is complicated, and suffers from error. The tilt of the first and second ultrasonic transducers with respect to the housing enables a simpler perpendicular assembly and simultaneously the free alignment of the ultrasonic transducers predefined by measurement demands. The tilt angle can be selected here such that the ultrasonic transducers are aligned with respect to one another; however, an additional correction angle can be provided in the opposite direction of the flow so that its radiation direction in particular results in measurement results that are as exact as possible with respect to drifts. The housings for the first and second ultrasonic transducers have a flow-optimized outer contour to generate as little noise as possible at the site of the first and second ultrasonic transducers since they conventionally work with the time of flight method.

In the embodiment with a third ultrasonic transducer as the noise-measuring ultrasonic transducer, the latter can be provided in a separate housing. This housing can serve to intentionally generate noise at the site of the third ultrasonic transducer, for example in that the housing projects into the flow or by flow-disturbing and thus noise-inducing perforations or deformations of the housing or by an interference body that projects into the flow and that can protrude from the housing. The noise can, however, also simply be caused by the flow flowing past the third ultrasonic transducer.

So that the conventional measurements using the first and second ultrasonic transducers are disturbed less by the noise, that is the flow disturbances, the intentional flow disturbances should take place as close as possible to the third ultrasonic transducer. Provision is therefore made in a further development that the interference body is arranged directly upstream of the third ultrasonic transducer.

To be able to use the third ultrasonic transducer independently of the direction of flow, provision is made in an embodiment that two interference bodies are present, one each upstream and downstream of the third ultrasonic transducer.

In a further embodiment, the noise-measuring ultrasonic transducer detects a break-off frequency f at which vortices break off. The control and evaluation device is then configured to determine the flow rate (v) via the measured break-off frequency (f).

This has the advantage that the flow rate v can be determined very simply in the control and evaluation unit from the break-off frequency f via the known linear relationship $$v=(f*d)/S \quad (3)$$

Here S is the Strouhal number and d is a transverse dimension of the object causing the breakaway vortex, e.g. the nose-measuring ultrasonic transducer or its housing.

To receive the pressure fluctuations due to the breakaway vortices in an optimum manner, the noise-measuring ultrasonic transducer is arranged such that the vortices break off in the region of a membrane of the noise-measuring ultrasonic transducer.

In an embodiment using a third ultrasonic transducer and to disturb the conventional time of flight measurements with first and second ultrasonic transducers as little as possible, provision is made in a further development of the invention that the third ultrasonic transducer is arranged downstream of the first and second ultrasonic transducers. Vortices that break off can then not directly disturb the measurement on the measurement path.

The conduit is preferably a pipeline having a cylindrical or rectangular cross-section that is configured for high flow rates of at least 100 m/s or even of at least 150 m/s and is in particular a flare gas conduit. The utilization in accordance with the invention of breakaway vortices opens up these new applications at very high flow rates to the ultrasound measurement. Pipelines having different cross-sections are naturally covered by the invention provided that high flow rates can be reached.

The subject of the invention is also a method for the determination of a flow rate of a fluid that flows in a conduit and that is possible using the measurement apparatus in accordance with the invention. In this respect, in a conventional manner, a flow rate is determined, namely via the time of flight difference of ultrasound that propagates on a measurement path from the first ultrasonic transducer to the second ultrasonic transducer and in the opposite direction from the second ultrasonic transducer to the first ultrasonic transducer. In addition, in accordance with the invention, the noise energy (intensity) generated is measured by the first or second ultrasonic transducers or by a third ultrasonic transducer when the fluid flows past this ultrasonic transducer. The flow rate is determined in the control and evaluation unit from the measurement signals using the noise energy measurements. Test results show that a comparison of flow rates that were determined via the noise energy values in accordance with the invention produces a surprising and sufficiently good agreement using reference values measured in a different manner. Measurements of the flow rate have thus become possible by means of ultrasonic transducers that could not be achieved with the previous time of flight technique.

To have a good reference here, that is to be able to associate a flow rate with a measured noise energy value, it is advantageous when, in a teaching phase or when starting up the fluid throughflow, flow rates are first determined in a conventional manner in accordance with the time of flight difference method by means of the first and second ultrasonic transducers and the associated noise energy is measured using the noise-measuring ultrasonic transducer. The individual flow rates are then stored together with the respective associated, measured noise energy values and the relationship of the value pairs are approximated by a mathematical function in an evaluation unit. With an increasing flow rate when the flow rate measurement using the first two ultrasonic transducers fails, the flow rate is determined using the then measured noise energy values of the noise-measuring ultrasonic transducer via the approximated function by means of extrapolation. Tests have shown that the extrapolation and references values measured in a different manner have a sufficiently good agreement.

When the stored noise energy values are always updated and when the approximation is consequently also updated when a measurement of the flow rate in accordance with the time of flight method is possible, a permanent adaptation to reference values takes place, whereby the noise energy values permanently deliver the best possible results.

A mathematical function of the form $$LW=c0+c1*\log(v)+c2*[\log(v)]^2, \quad (4)$$

where LW is a value for the noise; v designates the flow rate; and c0, c1, and c2 are coefficients to be determined using the approximation, satisfactorily reflects the relationship between the noise and the flow rate and delivers satisfactory flow values. It is also conceivable that the equation can be selected in another suitable form. What is decisive is that it allows an extrapolation beyond the range measurable by means of the conventional time of flight technique and continues to behave in a constant manner.

With knowledge of the conduit cross-section, a determination of the throughflow of the fluid flowing in the conduit via the flow rate is possible.

Figure 2:
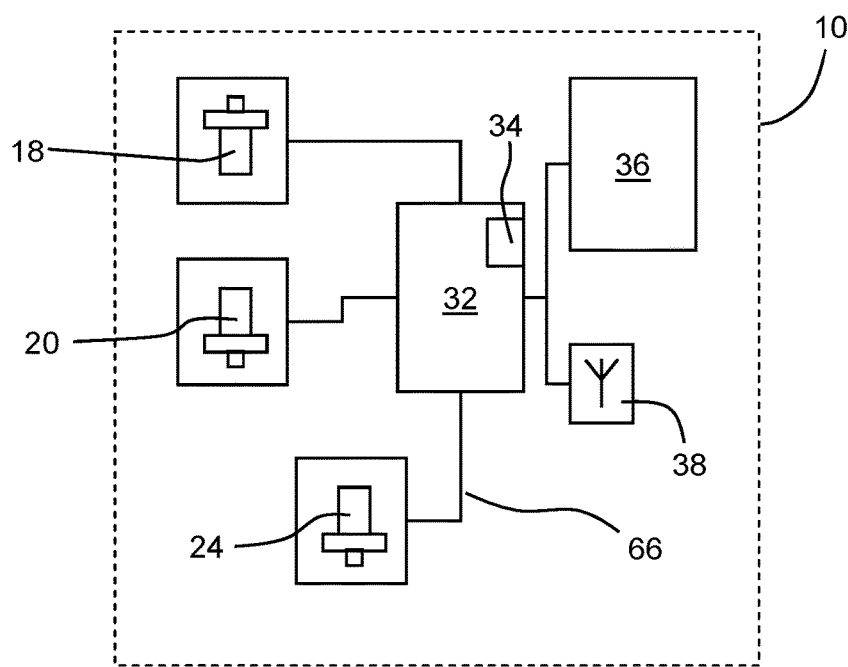
Figure 3A:
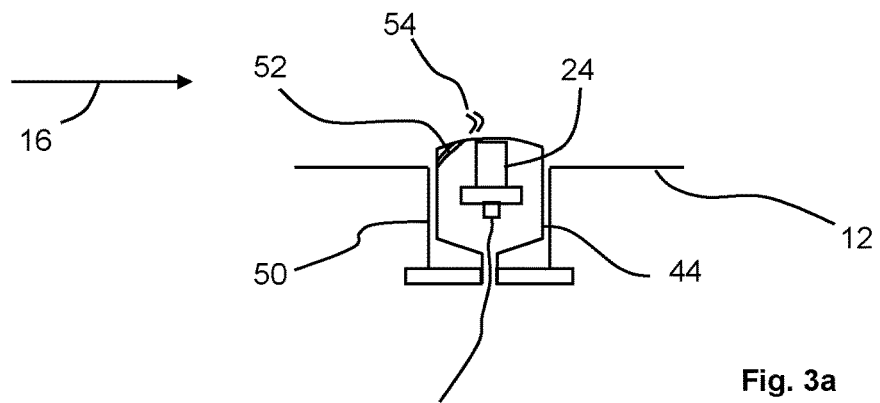
Figure 3B:
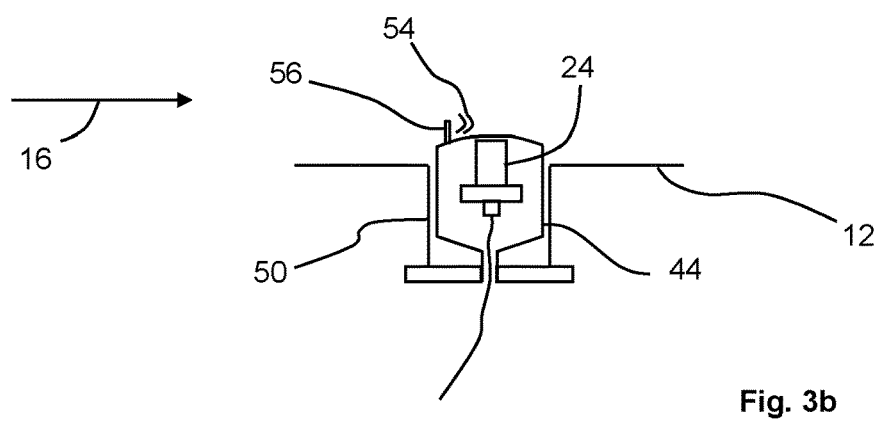
Figure 3C:
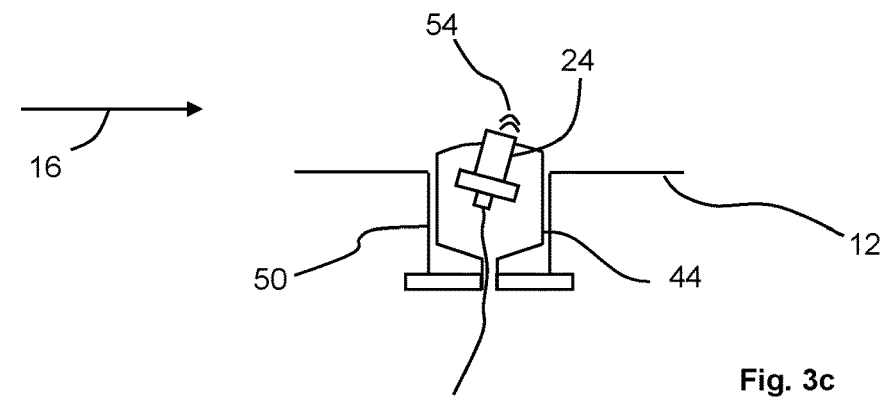
Figure 3D:
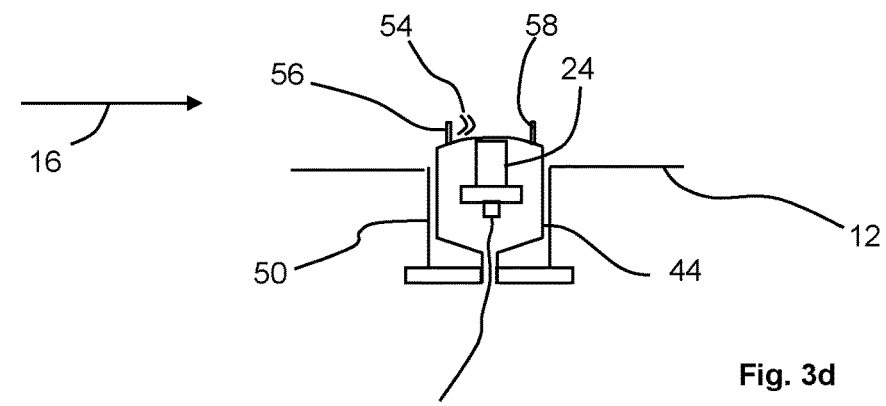

The invention will be explained in more detail in the following also with respect to further features and advantages by way of example with reference to embodiments and to the enclosed drawing. The Figures of the drawing show in:

FIG. 1 a longitudinal section through a pipeline with a first example of a measurement apparatus in accordance with the invention;

FIG. 2 a schematic block diagram of the measurement apparatus in accordance with FIG. 1;

FIG. 3a embodiments of the noise-measuring ultrasonic transducer;

FIG. 3b embodiments of the noise-measuring ultrasonic transducer;

FIG. 3c embodiments of the noise-measuring ultrasonic transducer;

FIG. 3d embodiments of the noise-measuring ultrasonic transducer;

FIG. 3e schematic drawing depicting noise-measuring ultrasonic transducer disposed into a fluid flow; and FIG. 4 a longitudinal section through a pipeline with a measurement apparatus in accordance with the prior art to explain a known ultrasound measurement method by means of a time of flight difference.

FIG. 1 shows in a longitudinal section a first embodiment of a measurement apparatus 10 in accordance with the invention which is installed at a pipeline 12 in which a fluid 14 flows in the direction marked by the arrow 16. The pipeline 12 is cylindrical, but could also have a different cross-section. A first ultrasonic transducer 18 and a second ultrasonic transducer 20 are aligned with respect to one another such that ultrasound transmitted on a measurement path 22 by the first ultrasonic transducer 18 can be received by the second ultrasonic transducer 20 and vice versa.

A third, noise-measuring ultrasonic transducer 24 is further in principle preferably arranged in a similar manner downstream of the first and second ultrasonic transducers 18 and 20 and has substantially the same function. The third ultrasonic transducer 24, however, does not transmit any ultrasound signals, but operates solely as a receiver, i.e. it only measures incoming sound signals. These incoming sound signals that can as a rule not be associated with any specific irradiation source are called "noise" in the following. If therefore some noise excites the membrane of the third ultrasonic transducer 24 such that it can output a measurable signal, this signal can be detected as noise by a subsequent device.

In a first embodiment (FIG. 1), the third ultrasonic transducer 24 detects the energy of the noise as a noise value, that is essentially the volume. Such noise is already generated simply by the flowing past of the fluid 14 and/or by flow disturbances, in particular breakaway vortices 54. The breakaway vortices 54 should be disposed at the site of or at least in spatial proximity to the ultrasonic transducer 24. A housing 44 of the third ultrasonic transducer 24 can serve for the intentional generation of such breakaway vortices and for this reason projects a little into the flow 16, as shown in FIGS. 3a to d. The flow 16 is thereby disturbed and a breakaway of the flow is effected at high flow rates.

FIGS. 3a to 3d show possible variants for noise generation. In accordance with FIG. 3a, the housing 44 has flow-disturbing and thus noise-causing perforations or deformations 52. Vortices such as breakaway vortices are shown schematically by simple arcs 54 in FIGS. 3a-d. In accordance with FIG. 3b, an interference body 56 is arranged at the housing 44; it projects into the flow 14 and protrudes from the housing 44 upstream of the ultrasonic transducer 24. The noise can, however, also simply be caused by the flow 16 flowing past the third ultrasonic transducer 24 when the third ultrasonic transducer 24 projects from its housing 44 into the flow 14, as indicated in FIG. 3c.

To be able to utilize the third ultrasonic transducer 24 independently of the flow direction 16, that is also to be able to utilize it ideally when the flow is directed opposite to the direction 16, provision is made in an embodiment in accordance with FIG. 3d that a further interference body 58 is arranged at the housing 44 next to the interference body 56 and preferably diametrically opposite the first ultrasonic transducer with respect to the ultrasonic transducer 24. Independently of the flow direction 16, the one interference body is thus upstream and the other interference body is downstream of the third ultrasonic transducer 24.

A break-off frequency f is detected in a second embodiment. This should be explained with reference to FIG. 3e. The third ultrasonic transducer 24 is arranged in the housing 44 that is arranged at a holder so that the ultrasonic transducer 24 projects into the flow 14 or is even fully disposed in the flow. The ultrasonic transducer 24 in its housing 44 therefore disturbs the flow 14 so that, with a correspondingly high flow rate v downstream of the third ultrasonic transducer 24 or of the housing 44 breakaway vortices 60 form and a Karman vortex street forms, as should be shown in FIG. 3e. The breakaway vortices 60 cause a pressure change in the proximity of a membrane 62 of the ultrasonic transducer 24. The membrane 62 is disposed in the direction of the breakaway vortices 60 for this purpose, that is at the end of the housing 44 disposed opposite the flow. The pressure changes are taken up by the membrane of the ultrasonic transducer 24 and excite the ultrasonic transducer 24 at its working frequency. A carrier signal thus arises that is modulated at a frequency f that corresponds to the break-off frequency of the breakaway vortices 60 and is forwarded to a control and evaluation unit 32 via a conduit 66 for further processing.

FIG. 2 shows the measurement apparatus 10 in a schematic block diagram, with here as in the following the same reference numerals marking the same features. A control and evaluation device 32, for example a microprocessor or another logic such as an FPGA, a DSP, or an ASIC, controls the transmission of ultrasound signals by the first or second ultrasonic transducers 18 or 20, for example as a series of pulses at an ultrasound frequency of 80 kHz and more, and evaluates the times of flight of the signals received at the oppositely disposed ultrasonic transducer 20 or 18. The control and evaluation device 32 can, as described in the introduction in connection with FIG. 4, calculate the flow speed v and the volume flow Q from this using the equations (1) and (2).

The control and evaluation device 32 also detects the signals of the third ultrasonic transducer 22, that is signals that in the first embodiment represent the intensity of the noise and in the second embodiment comprise the break-off frequency. The control and evaluation unit 32 determines a flow rate from these noise values.

The measurement results, that is the speed of sound or time of flight of the ultrasound signals, volume flows Q, sound values, and flow rates, can be further processed in that they are e.g. stored in a memory 34, are shown via a display 36, or are output by means of an interface 38 in a wired or also wireless manner, for instance serially, by Ethernet, wireless LAN, Bluetooth, cellular radio, or another standard, or are further processed in the control and evaluation unit 32 itself. Conversely, a computer, a notebook, a PDA or the like can be connected to configure or program the control and evaluation device 32, to upload firmware, or the like.

The basic function of the measurement method in accordance with the invention using the measurement apparatus 10 is the following here:

By means of the first and second ultrasonic transducers 18 and 20, the flow rate v is determined as described above, namely via the time of flight difference of ultrasound over the path forward and backward on the measurement path 22 between the first ultrasonic transducer 18 and the second ultrasonic transducer 20.

In addition, the noise generated in the third ultrasonic transducer 24 is measured on the flowing past of the fluid 14 in the third ultrasonic transducer 24 which is generated by the normal flowing past of the fluid or by the breakaway vortices 54, 60 and the pressure fluctuations associated therewith. This noise is detected and is transmitted as a sound signal to the control and evaluation unit 32 that determines a flow rate v therefrom.

In the second embodiment, the determination of the flow rate is very simple. The control and evaluation unit 32 determines the break-off frequency f from the signals. In accordance with the above-named equation $$v=(f*d)/S \qquad (3)$$

the flow rate v is determined via the break-off frequency f. Here, S is the Strouhal number (~0.21) and d is a transverse dimension of the object causing the breakaway vortices 60. Said object is the housing 44 in this embodiment in which the third ultrasonic transducer 24 is arranged. The dimension d therefore corresponds to the diameter d of the housing 44 (FIG. 3e).

So that the flow rate v can be determined as accurately as possible from the noise energy values in accordance with the first embodiment, it is advantageous to know the functional relationship between the measured noise energy values and the associated flow rate values. This knowledge is preferably acquired in a teaching phase or on the start-up of the fluid throughflow. On starting up the fluid throughflow or in the teaching phase, the flow rate is still in that range in which the conventional speed measurement using the first and second ultrasonic transducers 18 and 20 functions via the time of flight difference. While this conventional flow rate measurement takes place, the noise energy associated with a specific flow rate is respectively simultaneously measured by the third ultrasonic transducer 24. The individual flow rate values are then stored together with the respective associated measured noise energy values in the memory 34. The relationship of the value pairs is approximated by a mathematical function in the control and evaluation device 32. The following can, for example, be taken as the function:

$$LW=c0+c1*\log(v)+c2*[\log(v)]^2 \qquad (4)$$

where LW is a value for the noise, v designates the flow rate, and c0, c1, and c2 are coefficients that are determined by approximation to the measured values.

After the teaching phase, this functional relationship can be taken to acquire the flow rate v from the noise energy values.

If now the flow rate increases so much that the flow rate measurement in a conventional manner using the first two ultrasonic transducers 18 and 20 fails, the flow rate is determined using the then measured noise values LW of the third ultrasonic transducer via the approximated function by means of extrapolation. For this purpose, the function is extrapolated into the high flow rate ranges and the flow rates that correspond to measured noise values are acquired from the extrapolated function. A test comparison with reference values that were measured with a different technique showed good agreement.

The above function (4) is not the only possible one. It is also conceivable to find a different suitable functional relationship. Substantial criteria are that the function permits an extrapolation beyond the speed range measurement by means of the conventional time of flight technique and continues to behave constantly in this range.

Whenever a measurement of the flow rate v is possible using the two first ultrasonic transducers 18 and 20, an update of the approximation, that is an update of the coefficients c0, c1, and c2, can take place. This can take place in ongoing operation. A permanent adaptation thereby takes place, whereby the noise energy values LW permanently deliver the best possible results for the flow rate.

The two ultrasonic transducers 18 and 20 are also preferably arranged in a housing 40 and 42 that is preferably respectively fastened by perpendicular flange installation in a support 46, 48 oriented perpendicular to the pipeline. The housings 40, 42 are permeable for ultrasound 40, 42 or have an opening or the membranes are integrated into the housing 40, 42 at the site of the irradiation and of the reception in the region of the membranes of the ultrasonic transducers 18, 20 for irradiating or receiving ultrasound. The ultrasonic transducers 18, 20 are tilted by an angle of, for example, 15° with respect to their housing 40, 42 so that the measurement path 22 extends with the flow 16 in the one direction and against the flow 16 in the other direction. This angle can, contrary to what is shown in FIG. 1, intentionally be set against the direction of flow 16 so that only the ultrasound drifted by the flow 16 is respectively directed to the oppositely disposed ultrasonic transducer 18, 20.

The two housings 40 and 42 preferably have a flow-optimized outer contour which the flow flows past to suppress the formation of breakaway vortices in the flow at the housings 40 and 42 and thus to achieve the conventional time of flight measurement of the flow rate v up to and into speed ranges that are as high as possible (see also EP 2103912 B1). This is advantageous since the greater the flow rates that can still be measured using the conventional time of flight, the better the approximation that is obtained.

It is furthermore conceivable to use further pairs of ultrasonic transducers in addition to the ultrasonic transducers 18, 20 to obtain further measurement paths and to improve the conventional time of flight measurement to measure locally different portions of the flow rate in the manner of a classical multi-path system. Each measurement path here provides information on the flow rate in its local environment. If the flow is disturbed, this does not necessarily correspond to the mean flow rate and an imprecise determination of the volume throughput can also result. Further measurement paths over the cross-section of the pipeline 12 widen the base of information on the flow section and thus enable a more accurate measurement.

Furthermore, the already listed embodiment that has not been reflected in the Figures must again be pointed out. In this embodiment, the noise-measuring ultrasonic transducer is formed by the first or second ultrasonic transducer itself. If the flow rate is low, no noise or little noise is generated. Ideal conditions for the time of flight different method then prevail. As the flow rate increases, however, the unavoidable noise at the ultrasonic transducers themselves increases that somehow "affect" the flow or that are possibly directly introduced into the flow such as in the lance design in accordance with U.S. Pat. No. 4,754,650. In a transition phase, speed measurements in accordance with the time of flight method are still possible using the two ultrasonic transducers, but the noise increases and noise measurements are also possible. These different measurements can take place in time multiplex so that flow values are obtained from both measurement methods. As the flow rate increases further, the time of flight method will fail at some point and only the noise measurements will deliver flow values. The measurement task is thus also satisfied for any flow rate by a system that only consists of two oppositely disposed ultrasonic transducers. The noise measurements, as previously described for the other embodiments, comprise either the detection and evaluation of the noise energy or of the break-off frequency.

The invention claimed is:

1. A measurement apparatus for the determination of a flow rate and/or of a throughflow of a fluid flowing in a conduit, the measurement apparatus comprising at least one first ultrasonic transducer and one second ultrasonic transducer that are arranged with respect to one another in the conduit such that in operation the ultrasound waves transmitted and received on a measurement path from the first ultrasonic transducer to the second ultrasonic transducer has a time of flight difference dependent on the flow rate with respect to ultrasound waves in the reverse direction on the measurement path transmitted by the second ultrasonic transducer and received by the first ultrasonic transducer,
- a control and evaluation unit configured to control the ultrasonic transducers and to evaluate the signals of the ultrasonic transducers, and
- a noise-measuring ultrasonic transducer that is configured to measure a noise generated on the flowing past of the fluid in the ultrasonic transducer; and wherein the control and evaluation device is configured to determine the flow rate on the basis of the noise measurements.

2. The measurement apparatus in accordance with claim 1, wherein said at least one of the first ultrasonic transducer and the second ultrasonic transducer functions as the noise-measuring ultrasonic transducer.

3. The measurement apparatus in accordance with claim 1, wherein the noise-measuring ultrasonic transducer differs from the first ultrasonic transducer and from the second ultrasonic transducer.

4. The measurement apparatus in accordance with claim 1, wherein the noise is generated by breakaway vortices present at the noise-measuring ultrasonic transducer itself or by breakaway vortices present at a housing for the noise-measuring ultrasonic transducer.

5. The measurement apparatus in accordance with claim 1, wherein the noise-measuring ultrasonic transducer is configured to detect the energy of the noise, that is the intensity of the noise, and the control and evaluation unit is configured to determine the flow rate therefrom.

6. The measurement apparatus in accordance with claim 1, wherein the noise is caused by one of breakaway vortices present at an interference body projecting into the flow, perforations of the housing disturbing the flow, and deformations of the housing disturbing the flow; and wherein the interference body is arranged directly upstream of the noise-measuring ultrasonic transducer.

7. The measurement apparatus in accordance with claim 6, wherein the noise-measuring ultrasonic transducer is arranged such that the vortices break off in the region of a membrane of the noise-measuring ultrasonic transducer.

8. The measurement apparatus in accordance with claim 6, wherein the control and evaluation unit is configured to determine the flow rate while using the Strouhal number, with the determination taking place in accordance with the equation $v = (f*d) \div S$, where d is a transverse dimension of one of the noise-measuring ultrasonic transducer and its housing.

9. The measurement apparatus in accordance with claim 1, wherein two interference bodies are provided, one each upstream and downstream of the noise-measuring ultrasonic transducer.

10. The measurement apparatus in accordance with claim 9, wherein the control and evaluation unit is configured to determine the flow rate while using the Strouhal number, with the determination taking place in accordance with the equation $v = (f*d) \div S$, where d is a transverse dimension of one of the noise-measuring ultrasonic transducer and its housing.

11. The measurement apparatus in accordance with claim 1, wherein the noise-measuring ultrasonic transducer detects a break-off frequency at which vortices break off; and wherein the control and evaluation unit is configured to determine the flow rate via the measured break-off frequency.

12. The measurement apparatus in accordance with claim 1, wherein the conduit is a pipeline having a cylindrical or rectangular cross-section that is configured for high flow rates of at least 100 m/s.

13. The measurement apparatus in accordance with claim 12, wherein the conduit is a pipeline having a cylindrical or rectangular cross-section that is configured for high flow rates of at least 150 m/s.

14. The measurement apparatus in accordance with claim 12, wherein the conduit is a flare gas conduit.

15. A method for the determination of a flow rate of a fluid flowing in a conduit, the method comprising the steps of:
- evaluating a time of flight difference of ultrasound waves dependent on the flow rate between a first ultrasonic transducer and a second ultrasonic transducer, namely of ultrasound waves that propagates on a measurement path from the first ultrasonic transducer to the second ultrasonic transducer and in the reverse direction from the second ultrasonic transducer to the first ultrasonic transducer,
- measuring, on the flowing past of the fluid, the noise generated at an ultrasonic transducer by one of the first ultrasonic transducer, the second ultrasonic transducer, and a third ultrasonic transducer, and
- determining the flow rate using the noise measurements.

16. The method in accordance with claim 15, wherein, in a teaching phase or when starting up a measurement apparatus for said determination of a flow rate, flow rates are first determined via the time of flight of ultrasound signals and the intensity of the noise is simultaneously measured and the individual flow rate values are stored together with the respective associated measured noise values and the relationship of the value pairs is approximated by a mathematical function in an evaluation unit and the flow rate is determined with an increasing flow rate, when the flow rate measurement via the time of flight fails, using the then measured noise via the approximated function.

17. The method in accordance with claim 16, wherein the stored noise values are continuously updated and the approximation is consequently updated when a measurement of the flow rate via the time of flight is possible.

18. The method in accordance with claim 15, wherein the mathematical function has the form $LW = c0 + c1*\log(v) + c2*[\log(v)]^2$, where LW is a value for the noise and v is the flow rate, and c0, c1, and c2 are coefficients to be determined by approximation.

* * * * *